United States Patent [19]

Dawson

[11] 4,204,408
[45] May 27, 1980

[54] VACUUM COOLING

[75] Inventor: Peter Dawson, Burnley, England

[73] Assignee: Tweedy of Burnley Limited, Burnley, England

[21] Appl. No.: 916,787

[22] Filed: Jun. 19, 1978

[30] Foreign Application Priority Data

May 12, 1978 [GB] United Kingdom ............... 19104/78

[51] Int. Cl.$^2$ ...................... A01K 43/00; F26B 21/06; F25B 19/00
[52] U.S. Cl. .......................................... 62/62; 62/100; 62/170; 62/268; 34/51; 426/231
[58] Field of Search .................... 426/524, 231 X, 233; 62/62, 158, 169, 170, 100, 268; 34/51, 92

[56] References Cited

U.S. PATENT DOCUMENTS 4,115,596   9/1978   Knutrud .................... 62/100 X

FOREIGN PATENT DOCUMENTS 1413481   9/1972   United Kingdom ...................... 62/268

Primary Examiner—William E. Wayner
Attorney, Agent, or Firm—Norris & Bateman

[57] ABSTRACT

A method of cooling a moisture-containing foodstuff article is described, which involves placing the article in a chamber and evacuating the chamber to reduce the pressure in the chamber, whereby moisture evaporates from the article and the latent heat of the moisture is extracted from the article. In order to prevent damage to the article by a too-rapid evaporation, the evacuation is controlled in response to dimensional change (typically the height) of the article.

The invention also includes a method of controlling the evacuation of the chamber by progressively opening a valve in the pumping system to reduce the impedance (and hence increase the pumping rate) of the pumping system. This progressive opening of the valve is however, subject to an over-riding control which may arrest the opening action or initiate closing of the valve in response to a detected dimensional change of the article.

Apparatus for carrying out the method is also described including a vacuum chamber, a detection means arranged to detect changes in a dimension of the article being cooled, a transducer adapted to be operated by the detection means and an actuator controlled by the transducer and arranged to regulate the pressure within the chamber in response to control signals from the transducer.

17 Claims, 6 Drawing Figures

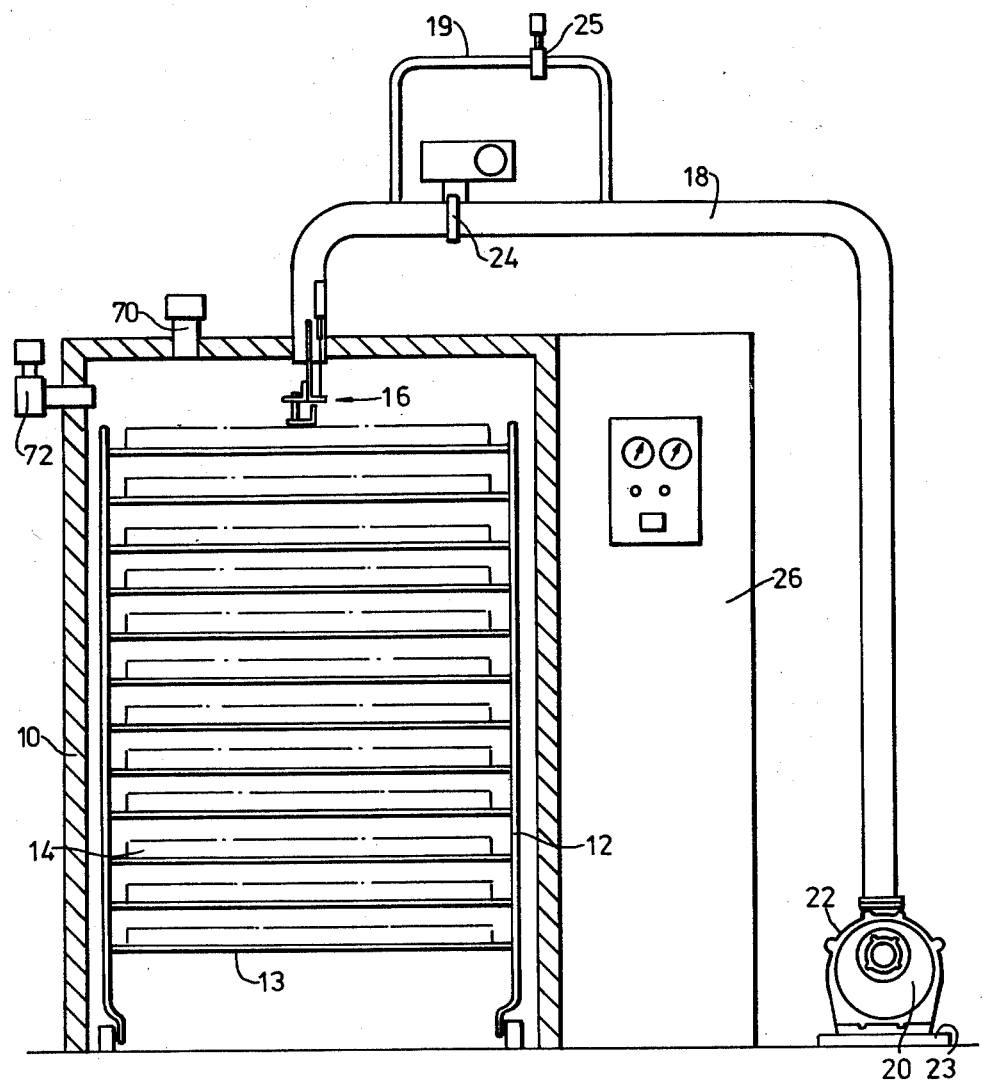
-F I

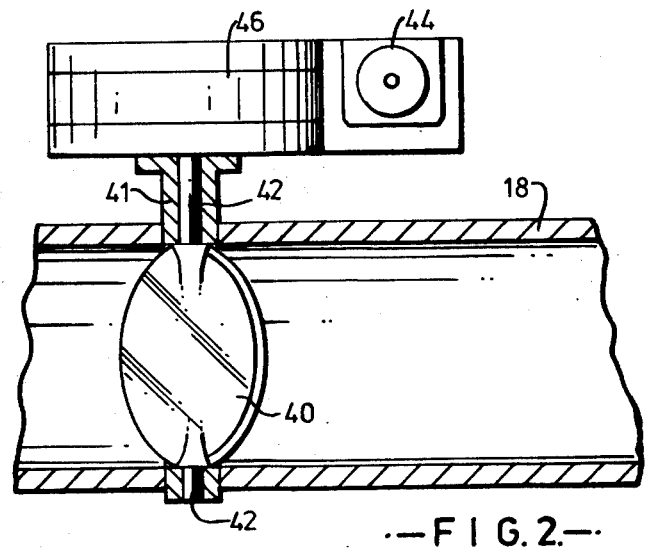
—FIG. 2.—
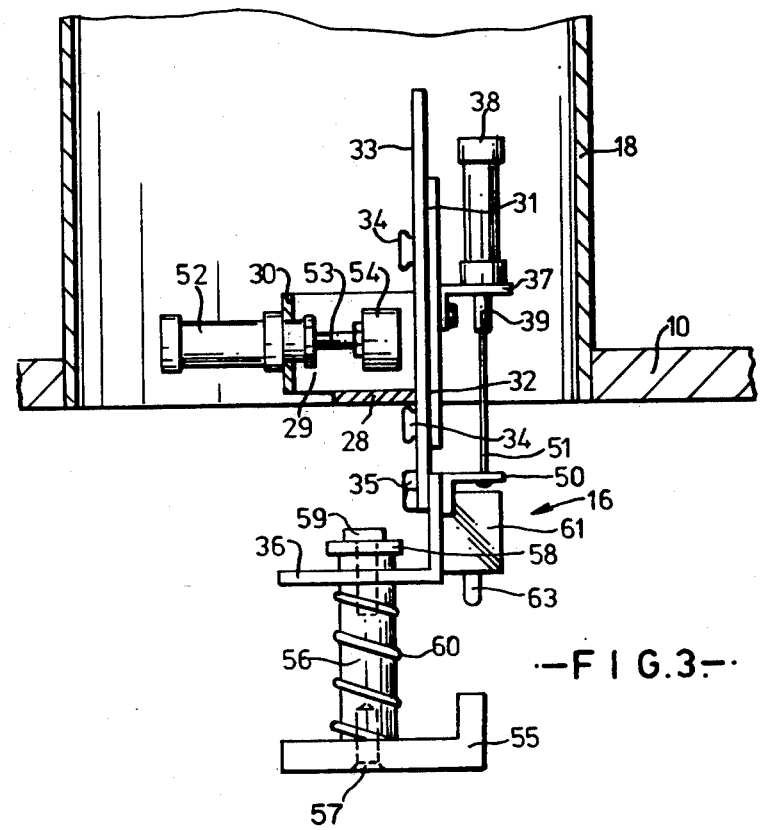
—FIG. 3.—

VACUUM COOLING

BACKGROUND OF THE INVENTION

The invention relates to a method of vacuum cooling moisture-containing foodstuff articles and includes apparatus for carrying out the method. The invention relates particularly to a method and apparatus for controlling rates of vacuum cooling.

Moisture-containing foodstuff articles can be cooled by subjecting the articles to reduce pressures, such that the moisture in the articles evaporates, the latent heat of evaporation being removed from the articles. In particular, this method can be used to cool baked farinaceous products such as bread and pie crusts. Vacuum cooling of foodstuff articles is attractive because it allows the temperature to be reduced quicker than is possible by the traditional method of simply allowing the articles to cool under atmospheric pressure, and it also ensures that the articles are in a controlled atmosphere during cooling which avoids certain disadvantages (e.g. spore growth) of the traditional atmospheric cooling.

However, it is sometimes difficult to carry out vacuum cooling of foodstuff articles without detracting from the desired characteristics of the finished articles. For example, if the article is of a type which will easily distort, too-rapid cooling will spoil the article, or even cause it to explode, whilst on the other hand if the cooling is too slow, then a thick hard crust may form on the article.

In the Specification of United Kingdom Pat. No. 1,413,481 a method of exercising control over the rate of cooling of farinaceous foodstuff articles by vacuum cooling is described. The present invention provides a method of excercising control over a vacuum cooling process, which may be used in conjunction with the method described in U.K. Patent Specification No. 1,413,481 but it is to be understood that the invention can also be used in instances where the method of that Patent is not employed.

GENERAL FEATURES OF THE INVENTION

According to one aspect of the invention a method of cooling a moisture-containing foodstuff article comprises placing the article in a chamber and evacuating said chamber to reduce the pressure of the atmosphere in said chamber so that moisture is given off by the article, and controlling the evacuation of said chamber in response to dimensional change of the article during cooling. Preferably the pressure in said chamber is reduced initially to a pressure near to the water vapour pressure corresponding to the temperature of the article before the control begins to be exercised.

Preferably the pressure in said chamber is reduced over a period of time and the rate of reduction of pressure with respect to time is controlled in response to the detected dimensional change. In the preferred method the control is excercised in response to a detected increase in a dimension of the article. The reduction in pressure may be terminated in response to the detection of a predetermined increase in a dimension of the article being cooled.

According to a preferred feature of this aspect of the invention the pumping rate of the system used to evacuate the chamber is progressively increased in stepwise manner, a detected predetermined increase in a dimension to the article being cooled causing retardation of the rate of increase of the pumping rate. "Pumping rate" is directly proportional to the capacity of the pump and the speed of the pump and is inversely proportional to the impedance of the pump system. Hence, the progressive increase in the pumping rate can be achieved:

by increasing the capacity of the pump;
by increasing the speed of the pump, or
by decreasing the impedance of the pumping system.

In a preferred method, a fluid-flow control valve in a conduit between the pump and the chamber is progressively opened to decrease the impedance in the pumping system, the rate of opening of said valve being subjected to regulation due to a detected change of a dimension of the article being cooled. Preferably the progressive opening of said valve is preprogrammed, the programme being subject to over-riding by signals received from a dimensional change detector.

According to a second aspect of the invention apparatus for controlling the rate of vacuum cooling of moisture-containing foodstuff articles comprises a vacuum chamber for containing the articles; a detection means arranged to detect changes in a dimension of a foodstuff article, a transducer adapted to be operated by said detection means, and an actuator controlled by said transducer and arranged to regulate the pressure of the atmosphere within said chamber in response to control signals from said transducer.

The detection means may detect changes in shape, volume, surface area, length, or width, but preferably detects changes in height of the foodstuff articles.

The detection of change of height is of particular advantage in controlling the vacuum cooling of certain breads, especially rye breads, which are prone to expand destructively if cooled too rapidly and which usually increase markedly in height during rapid vacuum cooling. Thus be detecting changes of height in the bread and regulating the pressure of the atmosphere surrounding the bread accordingly, the destructive expansion of the bread can be avoided. The apparatus according to the invention is therefore used to provide a feedback control whereby changes induced in the foodstuff article by a change in pressure within the chamber containing the article are detected and relayed to the actuator via or by the transducer so that a corresponding change in pressure can be effected, and in particular so that it is possible to correct any changes detected in the article which may be occurring too rapidly.

The transducer preferably comprises a switch and may comprise a microswitch, a pressure sensitive switch, a proximity switch or the like.

In the preferred arrangement, the apparatus includes a sensing element adapted to engage with the foodstuff article(s) and further adapted to be moved by expansion the the article(s) relatively to said transducer. Preferably the transducer is carried by a reference element which is adjustable within the chamber in the direction of movement of the sensing element. In one construction, said sensing element is suspended from said reference element and is adapted to rest on at least one foodstuff article, and said reference element may itself be suspended by a flexible element, so that it can be lowered with said sensing member into a datum position where said sensing element contacts the foodstuff article(s), locking means being provided for locking said reference member in any selected datum position.

The sensing element may be elongate, so that it is adapted to extend across a plurality of foodstuff articles. One or more light compression springs may be arranged to act between said reference element and said sensing element. Further, said reference element may be free to pivot on a mounting. The mountings of said sensing and reference elements ensure that initially those elements are free to take up their operative positions in which said sensing element rests on one or more of the foodstuff articles with said reference element spaced a predetermined distance above said sensing element prior to the pressure of the atmosphere surrounding the articles being regulated. If said reference element is then locked in this position, it sets a height datum against which expansion of the articles as detected by the lifting of said sensing element can be measured.

The apparatus preferably includes a pumping system comprising a pump and a pipe connecting said pump to the vacuum chamber, the actuator comprising a valve mounted in said pipe, and a pre-programmed control system for progressively opening said valve in stepwise manner to reduce the impedance in said pumping system, said transducer being arranged to apply an overriding control to said control system to vary the opening of said valve. Preferably said transducer is adapted when operated to stop the opening of said valve. It is further preferred that a second transducer adapted to be operated by excessive movement of said sensing element is further adapted when operated to initiate closing of said valve.

According to another preferred feature of the invention there is also provided an inlet valve controlling the admission of air into said vacuum chamber and adapted to be opened by operation of said second transducer.

According to a third aspect of the invention a method of cooling a moisture-containing foodstuff article comprises placing the article in a sealed chamber connected to a pumping system comprising a pump and a pipe which includes a valve, and includes the step of continuously operating said pump and progressively opening said valve in stepwise manner to reduce the impedance in said pumping system.

According to a fourth aspect of the invention a cooling apparatus for the treatment of moisture-containing foodstuff articles comprises a vacuum chamber to receive the article(s) to be cooled; a pumping system comprising a pump and a pipe connecting said pump to said vacuum chamber; a valve mounted in said pipe, and a pre-programmed control system for progressively opening said valve in stepwise manner to reduce the impedance in said pumping system. There may be a motor drivingly connected to said valve, and said control system may include a timer, the output signals from which cause operation of said motor, said timer being pre-programmed to to issue a series of output signals of predetermined duration and frequency.

SPECIFIC EMBODIMENT

One construction of apparatus in accordance with the invention and its method of operation, will now be described by way of example only, with reference to the accompanying drawings, in which:

FIG. 1 is a partly sectioned and somewhat diagrammatic front elevation of a vacuum cooling apparatus, FIG. 2 is a section through a valve assembly, FIG. 3 is a section through one end of a vacuum pipe showing a detection system.

Figure 4:
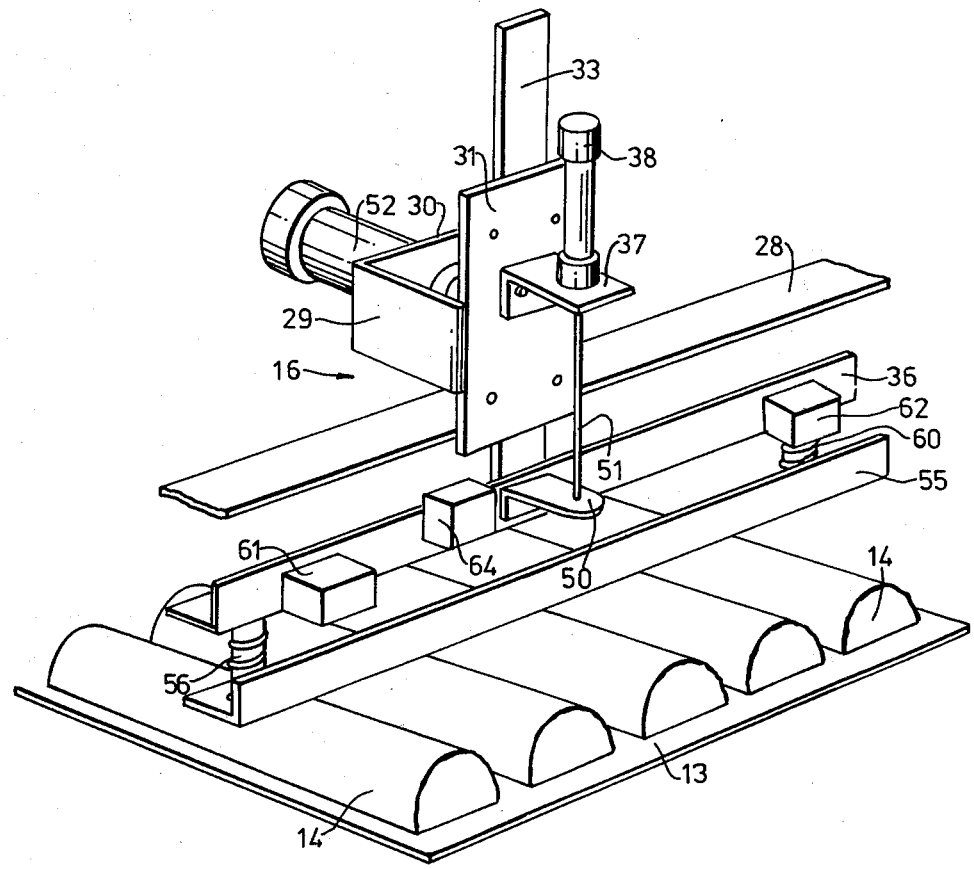
FIG. 4 is a perspective view of the detection system.

In order to speed up the distribution and sale of loaves of bread after baking, it is necessary to cool the loaves rapidly prior to their being packaged. The process of vacuum cooling in which loaves are placed in a sealed chamber and the pressure in the container is reduced, suggests itself as a means of rapidly cooling loaves. However, if the pressure in the container is reduced too quickly, the resulting rapid escape of the moisture from within the loaves can cause destruction deformation or even explosion of the loaves. In an attempt to overcome this problem, the process of vacuum cooling has to be modulated in some instances, such as by use of the method described in United Kingdom Patent Specification No. 1,413,481.

In the embodiment of the invention described with reference to the accopanying drawings a modulated vacuum process for the cooling of loaves of bread is regulated by altering the impedance of a pumping system. It is to be understood however that the invention in its broadest aspect can be applied to processes in which there is no modulation of the vacuum.

Referring to FIG. 1 of the drawings, a chamber for use in a modulated vacuum cooling process for cooling loaves is indicated generally at 10 and takes the form of a sealed pressure vessel. The cooling process for which the apparatus is designed operates on a batch system, and the chamber 10 is large enough to receive a portable rack 12 which itself supports shelves 13 on which loaves 14 of bread, such as rye bread are carried.

A pair of pipes 18 and 19 connects the inside of the chamber 10 with a vacuum pump 20 driven by a motor 22, the pipe 19 being arranged in parallel with part of the pipe 18. The pipe 18 in this particular example is of approximately 30 cms. diameter bore and the pipe 19 which provides a bypass for the pipe 18 is of approximately 2.5 cms. diameter bore. The pump 20 and the motor 22 are mounted on a base plate 23 adjacent to the chamber 10. Operation of the motor 22 causes the pump 20 to evacuate the chamber 10 via either or both of the pipes 18 and 19, and the motor 22, pump 20 and pipes 18 and 19 together form a pumping system for the apparatus. In order that the impedance of the pipe 18 and 19 (and therefore the impedance of the pumping system) can be varied, a valve 24 is provided in the pipe 18 and a valve 25 is provided in the pipe 19. Since the motor 22 operates at constant speed and the pump 20 has a fixed capacity, the pumping rate of the pumping system can only be varied by altering the impedance of the system, and the pumping rate is inversely proportional to the impedance.

An electrical control panel 26 is mounted on one side of the chamber 10 and houses control apparatus required to control the modulated vacuum cooling of the loaves 14 within the chamber 10 by controlling the operation of the motor 22 and the valves 24 and 25.

The valve 25 is a solenoid controlled on/off valve so that the pipe 19 can be either opened or closed under the control of the electrical control apparatus. The valve 24 on the other hand is a butterfly valve (shown more clearly in FIG. 2) and having a valve member 40 carried by a valve spindle 42 which is journalled in the valve body 41, which is itself fixed in the pipe 18. When closed, the valve 24 completely shuts off the pipe 18 and when fully opened, it permits virtually unimpeded flow through the pipe 18. A small electric motor 44 is connected to the valve spindle 42 via a speed reduction gearbox 46 which has a high velocity ratio, and may for example, be a double reduction worm gear unit. The reduction gearbox 46 is mounted on the valve body 41 and the motor 44 is mounted on the gearbox.

Operation of the motor 44 in one direction causes opening of the valve 24, and operation of the motor in the reverse direction causes closing of the valve 24. Because of the large speed reduction it is necessary to operate the motor for a protracted period (for example 40 seconds) in order to turn the valve member 24 through 90° from the fully closed to the fully opened position.

A detection apparatus 16 is provided (see FIGS. 1, 3 and 4) and as shown in FIG. 1, this apparatus is mounted within the chamber 10 adjacent to the inlet to the large diameter pipe 18. It is the function of the detection apparatus to control the application of the vacuum within the chamber 10 to avoid distortion or explosion of the loaves 14.

A horizontal plate 28 is welded to and bridges the inlet end of the pipe 18, and a short channel piece 29 is welded to this plate with its web 30 arranged vertically and spaced to one side of the plate 28. The open side of the channel piece 29 is closed by a vertical plate 31, welded to the ends of the flanges of the channel piece, but a slot 32 is left between this vertical plate 31 and the horizontal plate 28. The horizontal plate 28, channel piece 29 and vertical plate 31 together provide the mounting for the detection apparatus.

A vertical bar 33 rests against one face of the vertical plate 31 and passes through the slot 32, there being two pairs of nylon rollers 34, mounted on the plate 31 and holding the bar 33 pressed against the plate 31, but permitting vertical sliding motion of the bar 33. At its lower end, the bar 33 is pivoted at 35 to an angle iron reference element 36. As is clear from FIG. 4, the element 36 is in the form of a bar long enough to extend across a series of loaves 14 on the top shelf 13 of the rack 12, and in fact, it may extend across all the loaves on that shelf. Moreover, the pivot 35 is so arranged that the bar 36 will adopt a horizontal position if allowed to hang freely on its pivot.

A small angle bracket 37 projects from the vertical plate 31, and a pneumatic cylinder 38 is mounted on this bracket, the ram 39 of the cylinder projecting downwardly through the bracket. Another small bracket 50 is welded to the reference bar 36 and a flexible cable 51 connects the ram 39 to the bracket 50. When the pneumatic cylinder 38 is operated to retract the ram 39, the cable 51 lifts the reference bar 36 to a raised, inoperative, position, the bar 33 sliding vertically on the plate 31. When the ram 39 is projected, the reference bar is lowered to an operative position.

A second pneumatic cylinder 52 is mounted on the web 30 of the channel 29 and the ram 53 of this cylinder carries a friction pad 54 which is aligned with the bar 33. The ram 53 is shown in the retracted position in FIG. 3, but if it is projected, then it presses the pad onto the bar 33 and prevents vertical movement of the bar. Consequently, the reference bar 36 is then located at a position determined by the vertical position of the bar 33. This may be a higher position than that in which it would be suspended by the cable 51, in which case, the cable will be slack.

A sensing element 55 also takes the form of an angle iron bar of about the same length as the reference element 36. A pair of guide rods 56 is secured to the bar 55 by screws 57, these guide rods being arranged near to the ends of the bar 55. Each guide rod passes upwardly through a clearance hole in the reference bar 36, and a cap 58 is secured onto its upper end by a screw 59. The cap 58 limits the vertical spacing between the reference bar 36 and the sensing bar 55 by engaging with the top side of the horizontal flange of the reference bar. A light compression spring 60 surrounds each rod 56 and acts between the reference and sensing bars. It is possible to raise the sensing bar relatively to the reference bar when the latter is in the fixed datum position (locked by operation of the pneumatic cylinder 52) in which case, the caps 58 are lifted off the reference bar and the springs 60 compressed as shown in FIG. 3. If no pressure is applied to the sensing bar 55 however, it will hang below the reference bar, the spacing being the maximum permitted by the rods 56 and their respective caps 58. A pair of normally closed microswitches 61 and 62 are provided on the reference bar 36, and their actuator pins 63 are aligned vertically with the vertical flange of the sensing bar 55. Thus if the sensing bar is raised through a predetermined distance relatively to the reference bar, the switches will be opened by the sensing bar pressing the pins 63 upwardly.

A third microswitch 64 (referred to as the emergency switch) is located on the reference bar 36 but at a rather higher position than the switches 61 and 62, so that it is only actuated if the sensing bar continues to rise after it has operated the switches 61 and 62. The emergency switch is normally open, and it is connected in the control circuit in a manner which will hereinafter appear.

Included in the control circuit is an electronic timer 100 (FIG. 5) of known construction, which can be preprogrammed to give signals of predetermined duration and frequency, and this timer is arranged to caused operation of the motor 44 in a forward sense each time it produces a signal. The switches 61 and 62 are connected in series with the timer, so that if they are opened, the timer ceases to operate the motor 44.

Figure 5A:
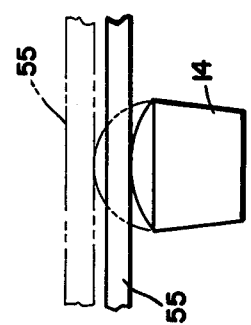
FIG. 5a is an enlarged scale detail view taken from the lower center of FIG. 5.
Figure 5:
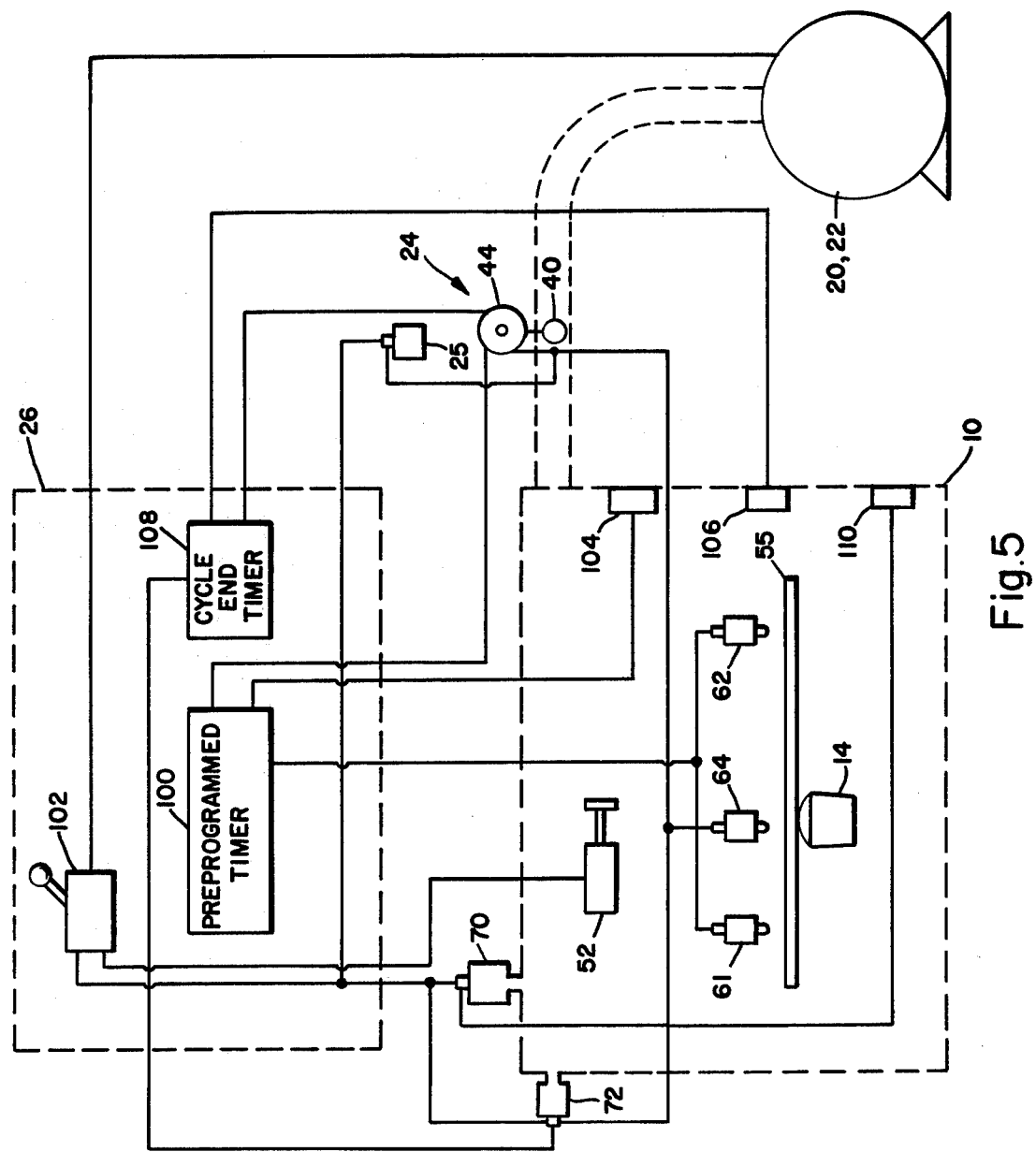
FIG. 5 is a circuit diagram of the controls for the vacuum cooling apparatus.

FIG. 5 appears to indicate parallel wiring only to avoid confusion in the Figure by the presence of additional lines.

An air inlet 70 is provided in the roof of the chamber 10, and this is controlled by a solenoid operated valve. In the normal operating condition, this air inlet is closed. In addition, there is a solenoid controlled bleeder valve 72 fitted to the chamber and this is also normally closed. Whereas the inlet 70 is adapted to allow a full flow of air into the chamber 10, when it is opened (being about 10 cms. diameter bore), the bleeder valve 72 has only a restricted bore so that it will only permit a restricted air flow into the chamber 10 when it is opened.

At the start of the modulated vacuum cooling process, the loaves 14 which have been baked (and which may have been partially cooled) are loaded onto the shelves 13 of the rack 12. The rack 12 is inserted into the chamber 10, and when the door of the chamber is moved towards the closed position, the pneumatic cylinder 38 is operated to lower the detection means 16 until the sensing bar 55 contacts and rests on top of the upper row of loaves 14 on the rack 12. If the loaves 14 are of uneven height, the assembly of the two bars 55 and 36 tilts about the pivot 35, so that the sensing bar rests on at least two of the loaves, but the sensing bar remains substantially parallel with and spaced from the reference bar 36. The cable 51 is long enough to permit the detection means 16 to be lowered to any possible position of engagement with the loaves and when the bars are in the position of rest, the cable 51 will be slack. The cooling cycle is then initiated by operation of a switch 102 (FIG. 5) and this first operates the cylinder 52, to lock the bar 36, and this sets the vertical position of the reference bar 36 in a datum position. It is to be noted that the datum position of the reference bar is set according to the height of the loaves at the commencement of cooling.

Initiation of the cooling cycle also causes the motor 22 to be operated to drive the pump 20 (and the pumping is then continuously operated until shut down of the appartus) but at this stage in the process, the valve 24 in the pipe 18 is closed, and the valve 25 in the bypass pipe 19 is opened, so that there is a considerable impedance in the connection between the pump 20 and the chamber 10. Air is withdrawn from the chamber 10 until the pressure in the chamber falls to a level equal to or just above the saturated vapour pressure of water at the temperature of the loaves. A pressure responsive switch 104 (FIG. 5) in the chamber 10 is preset to signal the attainment of this critical pressure, and the signal from this switch causes the motor 44 to be operated in a forward sense by the timer, at the pre-programmed rate, for example for one half second every fifteen seconds, and consequently the valve member 40 of the butterfly valve 24 is progressively opened in a stepwise fashion. This opening of the valve 24 begins to reduce the impedance of the pumping system.

Once the pressure within the chamber 10 is reduced below that of the saturated vapour pressure of the moisture within the loaves 14, the moisture begins to evaporate quite rapidly from the loaves which begin to swell upwardly. If the pressure is reduced too quickly, the loaves 14 tend to swell so quickly that they are liable to be distorted or even to explode. However, as soon as the upward expansion of the loaves 14 lifts the sensing bar 55 to a position where it engages with and opens the switches 61 and 62, the control circuit of the motor 44 is opened so that even though the timer continues to issue signals, there is no corresponding energisation of the valve motor 44 and the valve 24 remains in its partially opened position. Hence, the impedance in the pumping system remains unaltered, and the pressure/time curve of the atmosphere in the chamber 10 from then on takes the form of the hyperbola which occurs when the pumping rate is not modulated. This slows the cooling process.

If the loaves 14 actually shrink as a result of slowing the cooling process, the sensing bar 55 drops and the switches 61 and 62 are again closed and this reconnects the valve motor 44 to the timer for further opening of the valve 24.

If the upper loaves 14 rise so rapidly that the emergency switch 64 is closed by the sensing bar 55, then that changes the state of the control circuit (see FIG. 5) and overrides the timer, switching the motor 44 into reverse, and operating that motor in a continuous fashion. Thus, the valve 24 commences to close, producing an increase in the impedance in the pipe 18. At the same time, the solenoid controlled valve 72 is opened to admit a restricted flow of air into the chamber 10. Once the excessive swelling of the loaves has been counteracted and they begin to shrink again, the sensing bar drops and the emergency switch 64 opens, so that the reverse operation of the motor 44 stops. On further shrinkage of the loaves, when the sensing bar is released from the switches 61 and 62, the timer is reconnected with the valve motor 44 so that the valve 24 is again progressively opened to decrease the impedance and increase the vacuum in the chamber 10.

This control process comprising the steps of operating the switches 61 and 62, and perhaps the switch 64 may be repeated during the cooling process, and takes place quite automatically.

Although the control circuit is generally capable of exerting control over the process of modulated vacuum cooling carried out in the chamber 10 by pre-programming of the timer, the control circuit can and does receive information from the detection means 16 in the form of signals from the switches 61, 62 and 64. The modulated vacuum cooling process carried out in the chamber 10 is thus not merely a pre-programmed automatically controlled process but may, when the situation demands, be subjected to a degree of feedback control arising from operation of the detection means 16 which is arranged to detect changes in the height of the loaves 14 as is diagrametrically illustrated in FIG. 5a showing exaggerated movement of bar 55 by a swelling loaf 14 and to give a response to those changes in the form of a signal (or no signal) to the control panel and the control circuit which then exercises control of the valve motor 44, and the valves 24, 25 and 72 accordingly, all as illustrated in FIG. 5.

The electrical control circuit further includes a pressure responsive switch 106 (FIG. 5) located in the chamber 10 and pre-set to operate when a predetermined low pressure, slightly higher than the pressure at which the cooling process is to be terminated, is attained. When the switch is activated, a cycle end timer 108 is started, but the valve 24 continues to open (or to remain in a partially open state if the switches 61 and 62 are held open by the sensing bar 55). During the period of operation of the end timer (say about 30 seconds) the pressure in the chamber varies very little because the pressure/time curve is then following a near horizontal path. (In a typical example, the pressure reduces from 9 TORR to 5 TORR).

During the period that the cycle end timer is operating the internal pressure is equalising across each loaf of bread, and this is desirable to prevent distortion of the loaves when the pressure in the chamber increases.

At the end of the time delay, the motor 44 is switched into continuous reverse operation, and at the same time the valve 72 is opened, so that the impedance in the pumping system increases and some air is admitted into the chamber. The pressure in the chamber begins to rise slowly, and when a predetermined safe pressure is attained a pressure responsive switch 110 operates the valve 70 and allows a full flow of air into the chamber. It is then possible to open the door of the chamber and remove the rack 12 with the loaves 14, and the cooling cycle is complete.

I claim:

1. A method of cooling a moisture-containing foodstuff article comprising placing the article in a chamber and evacuating said chamber to reduce the pressure of the atmosphere in said chamber so that moisture is given off by the article, and controlling the evacuation of said chamber in response to dimensional change of the article during cooling.

2. A method of cooling a moisture-containing foodstuff article according to claim 1, in which the pressure in said chamber is reduced initially to a pressure near to the water vapour pressure corresponding to the temperature of the article before the control begins to be excercised.

3. A method of cooling a moisture-containing foodstuff article according to claim 1, in which the pressure in said chamber is reduced over a period of time, and the rate of reduction of pressure with respect to time is controlled in response to the detected dimensional change.

4. A method of cooling a moisture-containing foodstuff article according to claim 3, in which the control is excercised in response to a detected increase in a dimension of the article.

5. A method of cooling a moisture-containing foodstuff article according to claim 3, in which the reduction in pressure is terminated in response to the detection of a predetermined increase in a dimension of the article being cooled.

6. A method of cooling a moisture-containing foodstuff article according to claim 1, in which the pumping rate (as herein defined) of the system used to evacuate the chamber is progressively increased in stepwise manner, a detected predetermined increase in a dimension of the article being cooled causing retardation of the rate of increase of the pumping rate.

7. A method of cooling a moisture-containing foodstuff article according to claim 6, in which a fluid-flow control valve in a conduit between the pump and the chamber is progressively opened to decrease the impedance of the pumping system, the rate of opening of said valve being subjected to regulation due to a detected change of a dimension of the article being cooled.

8. An apparatus for controlling the rate of vacuum cooling of moisture-containing foodstuff articles comprising a vacuum chamber for containing the articles; a detection means arranged to detect changes in a dimension of a foodstuff article; a transducer adapted to be operated by said detection means, and an actuator controlled by said transducer and arranged to regulate the pressure of the atmosphere within said chamber in response to control signals from said transducer.

9. An apparatus for controlling the rate of vacuum cooling of moisture-containing foodstuff articles according to claim 8, further comprising a sensing element adapted to engage with the foodstuff article(s) and further adapted to be moved by expansion of the article(s) relatively to said transducer.

10. An apparatus for controlling the rate of vacuum cooling of moisture-containing foodstuff articles according to claim 9, in which said transducer is carried by a reference element; means mounting said reference element for adjustement within said chamber in the direction of movement of said sensing member.

11. An apparatus for controlling the rate of vacuum cooling of moisture-containing foodstuff articles according to claim 10, in which said sensing element is suspended from said reference element and is adapted to rest on at least one foodstuff article, and said reference element is itself suspended by a flexible member, so that it can be lowered with said sensing element into a datum position where said sensing element contacts the foodstuff article(s), and further comprising locking means for locking said reference element in any selected datum position.

12. An apparatus for controlling the rate of vacuum cooling of moisture-containing foodstuff articles according to claim 11, in which said sensing element is elongate so that it is adapted to extend across a plurality of foodstuff articles, and further comprising pivot means mounting said reference element and at least one light compression spring active between said reference element and said sensing element.

13. An apparatus for controlling the rate of vacuum cooling of moisture-containing foodstuff articles, according to claim 8, further comprising a pumping system which itself comprises a pump and a pipe connecting said pump to said vacuum chamber, said actuator comprising a valve mounted in said pipe and a preprogrammed control system for progressively opening said valve in stepwise manner to reduce the impedance in the pumping system, said transducer being arranged to apply an over-riding control to the control system to vary the opening of said valve.

14. An apparatus for controlling the rate of vacuum cooling of moisture-containing foodstuff articles according to claim 13, further comprising an inlet valve controlling the admission of air into said vacuum chamber and a second transducer adapted to be operated by excessive movement of said sensing member said second transducer being adapted to open said inlet valve.

15. A method of cooling a moisture containing foodstuff article comprising placing the article in a sealed chamber connected to a pumping system which includes a pump and a pipe there being a valve in said pipe, including the step of continuously operating said pump to reduce the pressure of the atmosphere in said chamber so that moisture is given off by the article, whereby heat is removed from the article and progressively opening said valve in stepwise manner to reduce the impedance in said pumping system said progressively opening of said valve being subjected to regulation in response to a condition of the article which is sensed during cooling.

16. A cooling apparatus for the treatment of moisture-containing foodstuff articles comprising a vacuum chamber to receive the article(s) to be cooled; a pumping system comprising a pump and a pipe connecting said pump to said vacuum chamber, there being a valve in said pipe and a pre-programmed control system for progressively opening said valve in stepwise manner to reduce the impedance in said pumping system said system including means for sensing a condition of the article and for regulating the progressively opening of said valve in response to said sensed condition.

17. A cooling apparatus for the treatment of moisture-containing foodstuff articles according to claim 16, in which there is a motor drivingly connected to said valve, and said control system includes a timer the output signals from which cause operation of said motor, said timer being preprogrammed to issue a series of signals of predetermined duration and frequency.

* * * * *